(12) United States Patent
Tamura et al.

(10) Patent No.: US 10,821,824 B2
(45) Date of Patent: Nov. 3, 2020

(54) IN-WHEEL MOTOR DRIVE DEVICE

(71) Applicant: NTN CORPORATION, Osaka (JP)

(72) Inventors: Shiro Tamura, Shizuoka (JP); Shinya Taikou, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 16/077,533

(22) PCT Filed: Sep. 29, 2016

(86) PCT No.: PCT/JP2016/078854
§ 371 (c)(1),
(2) Date: Aug. 13, 2018

(87) PCT Pub. No.: WO2017/149816
PCT Pub. Date: Sep. 8, 2017

(65) Prior Publication Data
US 2019/0054819 A1    Feb. 21, 2019

(30) Foreign Application Priority Data
Mar. 4, 2016    (JP) .................................. 2016-042214

(51) Int. Cl.
*B60K 7/00*    (2006.01)
*F16H 1/20*    (2006.01)
(Continued)

(52) U.S. Cl.
CPC .............. *B60K 7/0007* (2013.01); *B60K 7/00* (2013.01); *F16H 1/20* (2013.01); *H02K 7/116* (2013.01);
(Continued)

(58) Field of Classification Search
CPC .................... B60K 7/0007; B60K 7/00; B60K 2007/0061; F16H 1/20; H02K 7/116; H02K 7/14; Y02T 10/641
(Continued)

(56) References Cited

U.S. PATENT DOCUMENTS 8,596,395 B2 * 12/2013 Hirano ................ B60K 17/046
180/65.51
8,783,401 B2 * 7/2014 Nishiura ................ B60L 50/64
180/68.5
2011/0011656 A1   1/2011 Poulsen

FOREIGN PATENT DOCUMENTS

DE      199 32 587      1/2001
JP       50-28508       8/1975
(Continued)

OTHER PUBLICATIONS

Translation of JP 2011-148470A, Aug. 4, 2011.*

*Primary Examiner* — John D Walters
(74) *Attorney, Agent, or Firm* — Clark & Brody LP

(57) ABSTRACT

An in-wheel motor drive device speed reducer includes an input shaft coupled to a motor rotating shaft. an output shaft coupled to a wheel hub and parallel to the input shaft, and one or more intermediate shafts parallel to the input shaft and the output shaft. An input gear coupled to the input shaft, a plurality of intermediate gears coupled to the intermediate shafts, and an output gear coupled to the output shaft mesh with each other and configure a drive transmission path leading to the output gear from the input gear through the plurality of intermediate gears. When viewed axially using the intermediate shaft, axes of the output shaft, the at least one intermediate shaft, and the input shaft are arranged in this order in the vehicle front-to-rear direction. The axis of
(Continued)

the at least one intermediate shaft is disposed above the axes of the output and input shafts.

4 Claims, 6 Drawing Sheets

(51) Int. Cl.
  *H02K 7/116* (2006.01)
  *H02K 7/14* (2006.01)
(52) U.S. Cl.
  CPC ........ *H02K 7/14* (2013.01); *B60K 2007/0061* (2013.01); *Y02T 10/641* (2013.01)
(58) Field of Classification Search
  USPC ...................................................... 180/65.51
  See application file for complete search history.

(56) References Cited

FOREIGN PATENT DOCUMENTS

| | | |
|---|---|---|
| JP | 05-319111 | 12/1993 |
| JP | 06-156361 | 6/1994 |
| JP | 09-300993 | 11/1997 |
| JP | 2001-277866 | 10/2001 |
| JP | 2008-183985 | 8/2008 |
| JP | 2008-184110 | 8/2008 |
| JP | 2011-148470 | 8/2011 |
| JP | 2013-209016 | 10/2013 |
| JP | 2014-061880 | 4/2014 |
| JP | 5677142 | 2/2015 |
| KR | 10-2012-0095605 | 8/2012 |
| WO | 2013/008694 | 1/2013 |

* cited by examiner outer side of vehicle width direction ← front side of vehicle front side of vehicle
← front side of vehicle front side of vehicle front side of vehicle →

IN-WHEEL MOTOR DRIVE DEVICE

TECHNICAL FIELD

The present invention relates to an in-wheel motor drive device disposed inside a wheel and that drives the wheel, and particularly relates to an internal structure of an in-wheel motor drive device.

BACKGROUND ART

There are known for in-wheel motors, a direct-drive type that transmits output rotation of a motor to the wheel without any speed reduction, and a type combined with a speed reducer, in which the output rotation of the motor is transmitted to the wheel upon speed reduction with the speed reducer. Conventionally known as the speed reducer combined in-wheel motors are, for example, those described in Japanese Unexamined Patent Application Publication No. 2013-209016 (Patent Document 1) and Japanese Patent No. 5677142 (Patent Document 2). The in-wheel motor described in Patent Document 1 includes a parallel twin-shaft reducer in which an output shaft and an input shaft extend parallel to each other. The in-wheel motor described in Patent Document 2 includes a parallel triple-shaft reducer in which an output shaft, an intermediate shaft, and an input shaft extend parallel to each other.

CITATION LIST

Patent Literatures

[Patent Document 1] Japanese Unexamined Patent Application Publication No. 2013-209016
[Patent Document 2] Japanese Patent No. 5677142

SUMMARY OF INVENTION

Technical Problem

However, the present inventor found out a further point to be improved, in the aforementioned conventional in-wheel motor. Namely, with the parallel twin-shaft reducer described in Patent Document 1, there is only a one-stage speed reducing mechanism between the two shafts, and a sufficient speed reduction ratio cannot be achieved.

The in-wheel motor described in Patent Document 2 has a two-stage speed reducing mechanism between the three shafts, and thus a sufficient speed reduction ratio can be achieved as compared to Patent Document 1, however since a first motor and a first speed reducer are placed directly above the axle and a second motor and a second speed reducer are placed directly below the axle in a small space within the wheel, no space can be secured within the wheel below or above the in-wheel motor. This cannot allow for the in-wheel motor to be supported in a manner capable of being steered about a steering axis that extends in a vertical direction.

In view of the above circumstances, an object of the present invention is to provide an in-wheel motor drive device that can achieve a sufficient reduction ratio as compared to the conventional art, and which secures a space below the in-wheel motor drive device inside the wheel.

Solution to Problem

In order to achieve this object, an in-wheel motor drive device according to the present invention includes: a wheel hub bearing unit including a wheel hub extending in a vehicle width direction, and which rotatably supports the wheel hub; a motor that drives the wheel hub; and a speed reducer unit that reduces the speed of a motor output rotation and transmits this to the wheel hub bearing unit. Among these, the speed reducer unit includes an input shaft that couples to a motor rotating shaft of the motor; an output shaft that couples to the wheel hub and extends parallel to the input shaft; at least one intermediate shaft extending parallel to the input shaft and the output shaft; an input gear that couples to the input shaft; an output gear that couples to the output shaft; and a plurality of intermediate gears that couple to the intermediate shaft, wherein the input gear, the plurality of intermediate gears, and the output gear mesh with each other and configure a drive transmission path leading to the output gear from the input gear through the plurality of intermediate gears. Moreover, an axis of the input shaft, an axis of at least one intermediate shaft among the intermediate shafts, and an axis of the output shaft are arranged in this order in a vehicle front-to-rear direction, and the axis of at least one intermediate shaft among the intermediate shafts is positioned above the axis of the input shaft and the axis of the output shaft.

According to such present invention, by disposing the intermediate shaft above the wheel hub, a space can be secured directly below the wheel hub, in an inner hollow region of the wheel. Therefore, by disposing a suspension member in such a space and connecting with the in-wheel motor drive device allowing for moving rotationally, the steering axis extending in the vertical direction can be provided intersecting such a space. The steering axis extends intersecting with the wheel and the in-wheel motor drive device, thus allowing the wheel and the in-wheel motor drive device to suitably be steered about the steering axis. The number of intermediate shafts included in the speed reducer unit may be one, or may be a plural number, and is not limited in particular. In a case in which the speed reducer unit includes just one intermediate shaft, the reducer unit is classified as a triple-shaft parallel shaft gear reducer. Alternatively, in a case in which the speed reducer unit includes a plural number of intermediate shafts, the reducer unit will be a parallel shaft gear reducer having four or more shafts. Moreover, the intermediate shaft may further be equipped with a speed reducing mechanism configured of a planetary gear set. The input shaft may be disposed more forward in the vehicle than the output shaft, or may be disposed more rear in the vehicle than the output shaft. The axis of the input shaft and the axis of the output shaft are arranged in a front-to-rear direction of the vehicle, having intervals provided therebetween. One intermediate shaft disposed in the front-to-rear direction position between the input and output shafts and one intermediate shaft disposed above the axis of the input shaft and the axis of the output shaft may be identical or may be different.

By providing the in-wheel motor drive device inside the wheel, the output shaft of the speed reducer unit extends in the vehicle width direction. Moreover, the input shaft and the intermediate shaft that extend parallel to the output shaft also extend in the vehicle width direction. Moreover, the gears coaxially coupling to these shafts are made to be in a posture standing in a vertical direction. As one embodiment of the present embodiment, the input shaft and the output shaft extend in the vehicle width direction, the input gear and the output gear are made to be in a posture standing in the vertical direction, and a lower edge of the output gear is disposed below a lower edge of the input gear. According to the embodiment, even in a case in which the output gear that rotates at low speed becomes immersed in lubricating oil stored in a lower part of the reducer unit, the input gear that rotates at high speed will not be immersed in the lubricating oil stored in the lower part of the reducer unit, and thus stirring resistance of the input gear can be avoided. As other embodiments, a lower edge of the output gear may be disposed above the lower edge of the input gear.

As one suitable embodiment of the present invention, at least one intermediate shaft includes a first intermediate shaft disposed above and adjacent to the input shaft, which first intermediate shaft is supplied with drive torque from the input shaft, and a final intermediate shaft disposed above and adjacent to the output shaft, which final intermediate shaft supplies the drive torque to the output shaft, and the axis of the input shaft, the axis of the first intermediate shaft, the axis of the final intermediate shaft, and the axis of the output shaft, when viewed from an axial direction, are arranged in such a manner that a reference line that successively connects the axis of the input shaft, the axis of the first intermediate shaft, the axis of the final intermediate shaft and the axis of the output shaft draws an inverted U-shape. According to such an embodiment, the overall positions of the plurality of shafts and gears that configure the drive transmission path is reduced in size, thus allowing for housing the plurality of shafts and gears inside the wheel. The inverted U-shape refers to a U-shape having its top and bottom flipped upside down. As another embodiment, these may be arranged as an inverted M-shape. Note that "above" should be understood as including "directly above" and "diagonally above".

As a further preferable embodiment of the present invention, the wheel hub is a tubular body, and the wheel hub bearing unit further includes a stationary shaft that is disposed in a center hole of the wheel hub and that rotatably supports the wheel hub. According to such an embodiment, the output gear can be coupled coaxially on an outer diameter side of the wheel hub that serves as an outer ring, which wheel hub bearing unit has its outer ring rotatable and its inner ring stationary. Furthermore, drive force can be transmitted to the wheel hub, from an intermediate shaft disposed offset and away from the wheel hub. As another embodiment, the wheel hub bearing unit may be made rotatable at the inner ring and stationary at the outer ring, may have the output shaft coupled to an edge of the wheel hub serving as the inner ring, and may dispose the output gear away in the axial direction from the wheel hub that serves as the inner ring.

Advantageous Effects of Invention

According to the present invention as such, a steering axis extending in a vertical direction is arranged so as to intersect with the wheel and the in-wheel motor drive device, to allow for improving steering properties of the wheel and the in-wheel motor drive device.

DESCRIPTION OF EMBODIMENTS

Figure 1:
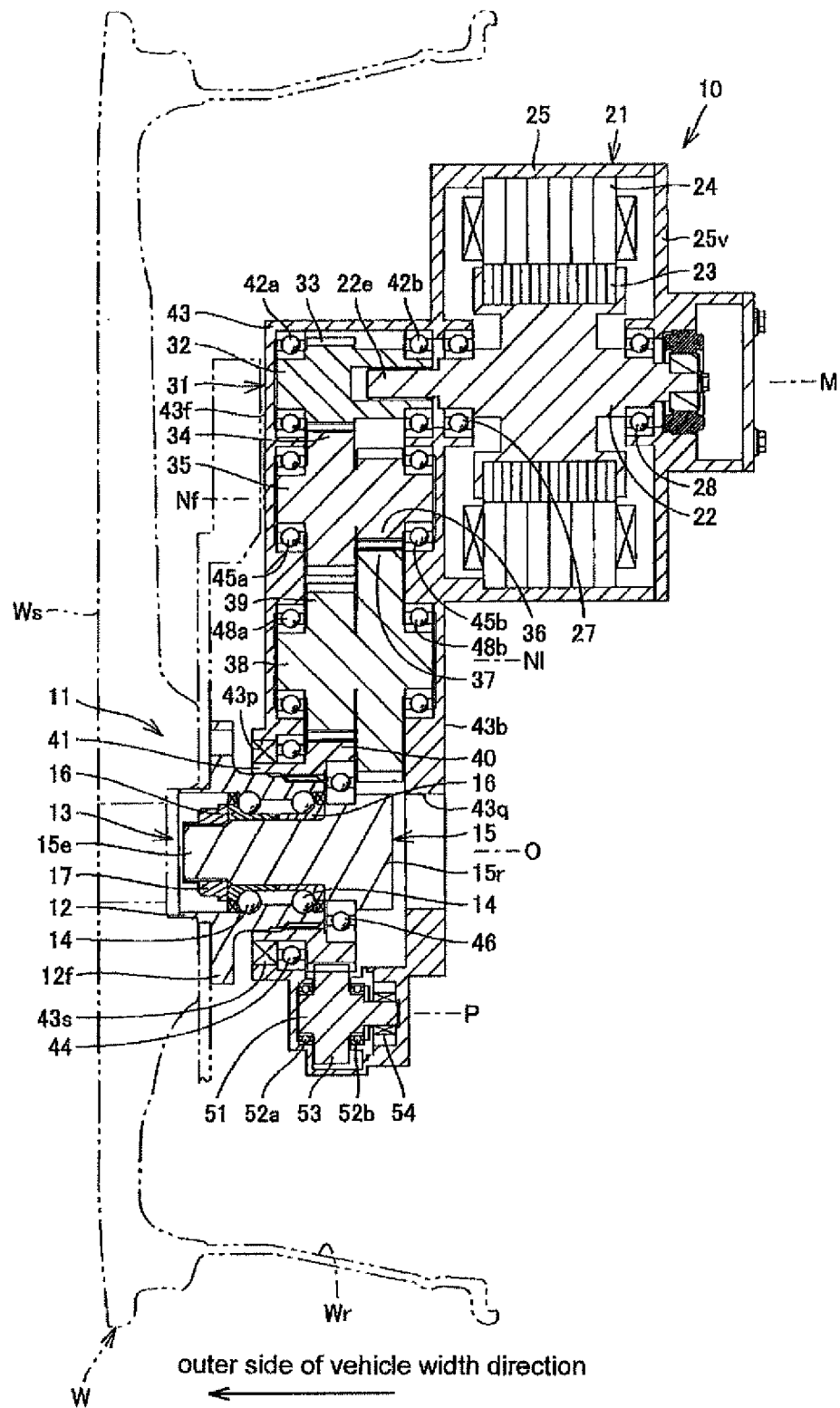
FIG. 1 is a longitudinal section view cutting an in-wheel motor drive device that serves as a first embodiment of the present invention at a predefined plane, and showing this in a developed manner.
Figure 2:
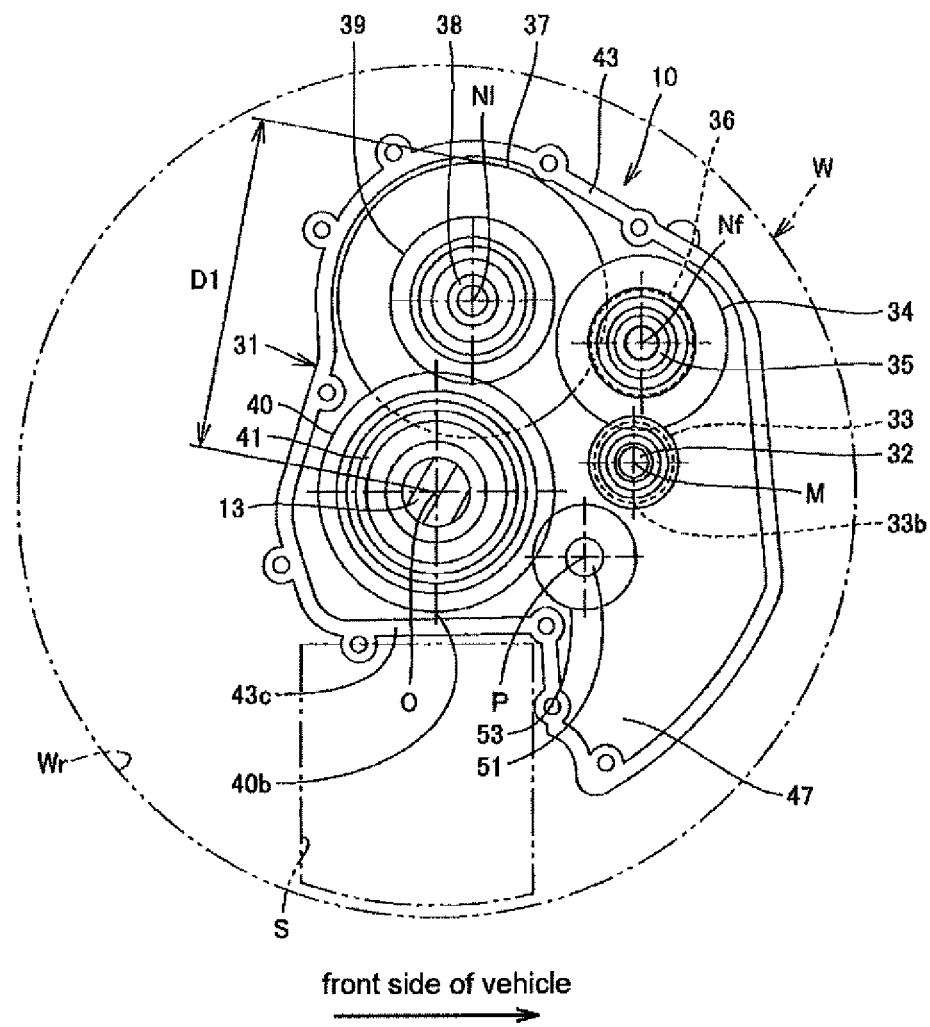
FIG. 2 is a front view showing the inside of the first embodiment.
Figure 3:
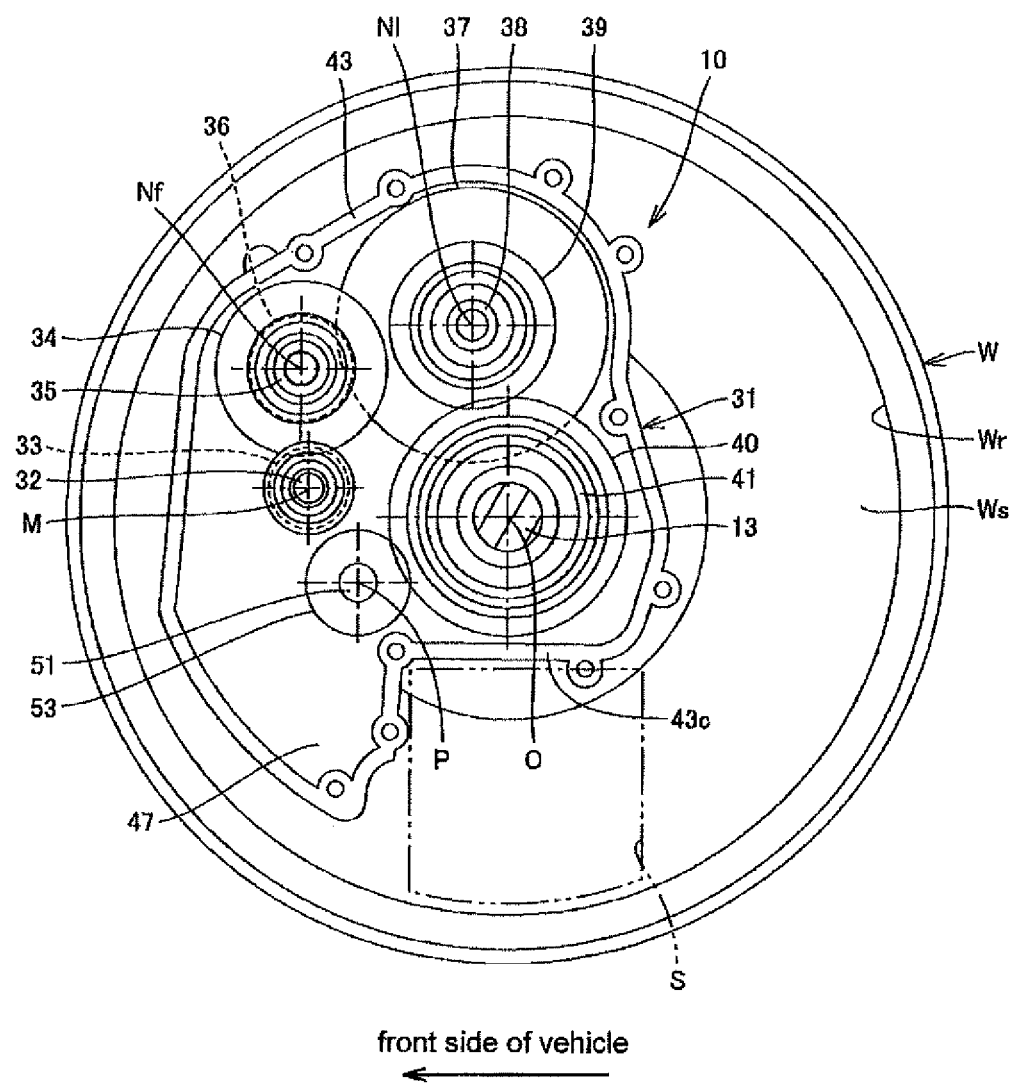
FIG. 3 is a back view showing the inside of the first embodiment.

Embodiments of the present invention will be described below in details based on the drawings. FIG. 1 is a longitudinal section view cutting an in-wheel motor drive device 10 that serves as a first embodiment of the present invention at a predefined plane, and showing this in a developed manner. FIG. 2 is a front view showing the first embodiment, representing a state in which a front portion 43f of a body casing 43 is removed from the in-wheel motor drive device 10 in FIG. 1 to view the inside of the in-wheel motor drive device 10 from a left side in the drawing of FIG. 1. The predefined plane shown in FIG. 1 is a developed plan view connecting a plan view including an axis M and an axis Nf shown in FIG. 2, a plan view including the axis Nf and an axis Nl, and a plan view including the axis Nl and an axis O, in this order. FIG. 3 is a back view showing the first embodiment, representing a state in which a motor unit 21 and a back portion 43b of the body casing 43 is removed from the in-wheel motor drive device in FIG. 1 to view gears inside the in-wheel motor drive device 10 from a right side in the drawing of FIG. 1.

The in-wheel motor drive device 10 includes: a wheel hub bearing unit 11 connecting with a center of a road wheel W being represented by a virtual line as shown in FIG. 1; the motor unit 21 that drives the road wheel W of the wheel; and a reducer unit 31 that reduces the rotation of the motor unit and transmits this to the wheel hub bearing unit 11, and is disposed in a wheel housing (not shown) of an electric motor vehicle. The motor unit 21 and the reducer unit 31 are not disposed coaxially to the axis O of the wheel hub bearing unit 11, but are disposed offset from the axis O of the wheel hub bearing unit 11 as shown in FIG. 2. The road wheel W is one that is well known; a tire not shown is fitted onto the periphery of the road wheel W; the wheels W are positioned at the front, rear, left and right of a vehicle body. The vehicle body configures the electric motor vehicle together with the wheels. The in-wheel motor drive device 10 can make the electric motor vehicle run at a speed of 0 to 180 km/h on a public road.

The wheel hub bearing unit 11 has an outer ring 12 as a wheel hub that couples to the road wheel W, an inner fixing member 13 passed through a center hole of the outer ring 12, and a plurality of rolling elements 14 disposed in a ring-shaped gap between the outer wheel 12 and the inner fixing member 13, and configures an axle. The inner fixing member 13 includes an unrotating stationary shaft 15, a pair of inner races 16, and a lock nut 17. The stationary shaft 15 is formed to have a diameter larger at its root part 15r than at its tip part 15e. The inner races 16 fit with the outer periphery of the stationary shaft 15, between the root part 15r and the tip part 15e. The lock nut 17 is screwed to the tip part 15e of the stationary shaft 15, and fixes the inner races 16 between the lock nut 17 and the root part 15r.

The stationary shaft 15 extends along the axis O, and the tip part 15e of the stationary shaft 15 is directed outwards in a vehicle width direction. The root part 15r of the stationary shaft 15 is directed inwards in the vehicle width direction, and matches with an opening 43q formed at the back portion 43b of the body casing 43. A bracket not shown is inserted into the opening 43q from outside, and the bracket is to be attached and fixed to the root part 15r within the body casing 43. Furthermore, the bracket will connect to a suspension member not shown, outside the body casing 43.

The rolling element 14 is arranged in multiple rows separated in the axis O direction. An outer periphery surface of the inner races 16 on one side in the axis O direction configures an inner race surface for a first row of the rolling element 14, and faces an inner periphery surface of the one side in the axis O direction of the outer ring 12. The outer periphery surface of the inner race 16 on the other side in the axis O direction configures an inner race surface for a second row of the rolling element 14, and faces an inner periphery surface of the other side in the axis O direction of the outer ring 12. In the following description, the outwards side in the vehicle width direction (outboard side) is also referred to as one side in an axial direction, and an inwards side in the vehicle width direction (inboard side) is also referred to as the other side in the axial direction. The left-right directions in the drawing of FIG. 1 corresponds to the vehicle width direction. The inner periphery surface of the outer ring 12 configures the outer race surface of the rolling element 14.

A flange 12f is formed on one end in the axis O direction of the outer ring 12. The flange 12f configures a coupling unit for coaxially coupling a brake rotor not shown and a spoke portion Ws of the road wheel W. The outer ring 12 couples to the road wheel W at the flange 12f, and rotates integrally with the road wheel W.

As shown in FIG. 1, the motor unit 21 has a motor rotating shaft 22, a rotor 23, a stator 24, a motor casing 25, and a motor casing cover 25v, and these are disposed successively in this order from the axis M of the motor unit 21 to an outer diameter side. The motor unit 21 is a radial gap motor with an inner rotor and outer stator form, however this may be of another form. For example, although not shown, the motor unit 21 may be an axial gap motor.

The axis M serving as the center of rotation for the motor rotating shaft 22 and the rotor 23 extends parallel to the axis O of the wheel hub bearing unit 11. Namely, the motor unit 21 is disposed offset, to be away from the axis O of the wheel hub bearing unit 11. An axial directional position of most parts of the motor unit 21 excluding the tip part of the motor rotating shaft 22 does not overlap with an axial directional position of the inner fixing member 13, as shown in FIG. 1. The motor casing 25 is shaped substantially cylindrical, and couples to the back part 43b of the body casing 43 at one end in the axis M direction and is sealed to the motor casing cover 25v of a bowl-shape at the other end in the axis M direction. Both end parts of the motor rotating shaft 22 are rotatably supported by the motor casing 25 via the rolling-element bearings 27, 28. The motor unit 21 drives the outer ring 12.

The reducer unit 31 has an input shaft 32, an input gear 33, an intermediate gear 34, an intermediate shaft 35, an intermediate gear 36, an intermediate gear 37, an intermediate shaft 38, an intermediate gear 39, an output gear 40, an output shaft 41, and the body casing 43. The input shaft 32 is a tubular body having a larger diameter than a tip part 22e of the motor rotating shaft 22, and extends along the axis M of the motor unit 21. The tip part 22e is received inside a center hole on the other end of the input shaft 32 in the axis M direction, and the input shaft 32 couples coaxially with the motor rotating shaft 22. Both ends of the input shaft 32 are supported by the body casing 43 via the rolling-element bearings 42a, 42b. The input gear 33 is an external gear having a smaller diameter than the motor unit 21, and couples coaxially to the input shaft 32. More specifically, the input gear 33 is formed integrally with the outer periphery of a center part of the input shaft 32 in the axis M direction.

The output shaft 41 is a tubular body having a larger diameter than the outer ring 12, and extends along the axis O of the wheel hub bearing unit 11. The other end of the outer ring 12 in the axis O direction is received in a center hole at the one end in the axis O direction of the output shaft 41, and the output shaft 41 couples coaxially to the outer ring 12. The one end of the output shaft 41 in the axis O direction is supported by the body casing 43 via the rolling-element bearing 44. The other end of the output shaft 41 in the axis O direction is supported by the root part 15r of the stationary shaft 15 via the rolling-element bearing 46. The output gear 40 is an external gear, and couples coaxially to the output shaft 41. More specifically, the output gear 40 is formed integrally with the outer periphery of the other end of the output shaft 41 in the axis O direction.

The two intermediate shafts 35, 38 extend parallel to the input shaft 32 and the output shaft 41. Namely, the reducer unit 31 is a quadruple-shaft parallel shaft gear reducer, and the axis O of the output shaft 41, the axis Nf of the intermediate shaft 35, the axis Nl of the intermediate shaft 38, and the axis M of the input shaft 32 each extend parallel to each other, in other words, extend in the vehicle width direction.

Describing in relation to the front-to-rear direction position of the vehicle of each shaft, as shown in FIG. 2, the input shaft 32 is disposed in the vehicle anterior of the output shaft 41. Moreover, the intermediate shaft 35 is disposed in the vehicle anterior the input shaft 32. The intermediate shaft 38 is disposed in the vehicle anterior of the output shaft 41 and disposed in the vehicle posterior of the input shaft 32. As a modification not shown, the input shaft 32, the intermediate shaft 35, the intermediate shaft 38, and the output shaft 41 may be disposed in the front-to-rear direction in this order. This order will also be the order in which the drive force will be transmitted.

Describing in relation to the vertical directional positions of each axis, the axis M of the input shaft 32 is arranged above the axis O of the output shaft 41. The axis Nf of the intermediate shaft 35 is arranged above the axis M of the input shaft 32. The axis Nl of the intermediate shaft 38 is arranged above the axis Nf of the intermediate shaft 35. The axes Nf, Nl of the intermediate shafts 35, 38 are sufficient as long as they are arranged above the axes M, O of the input shaft 32 and output shaft 41. As a modification not shown, the axis Nf of the intermediate shaft 35 may be arranged above the axis Nl of the intermediate shaft 38. Alternatively, as a modification not shown, the axis O of the output shaft 41 may be arranged above the axis M of the input shaft 32.

The intermediate gear 34 and the intermediate gear 36 are external gears, and coaxially couple to a center part of the intermediate shaft 35 in the axis Nf direction as shown in FIG. 1. Both ends of the intermediate shaft 35 are supported by the body casing 43 via the rolling-element bearings 45a, 45b. The intermediate gear 37 and the intermediate gear 39 are external gears, and coaxially couple to a center part of the intermediate shaft 38 in the axis Nl direction. Both ends of the intermediate shaft 38 are supported by the body casing 43 via the rolling-element bearings 48a, 48b.

The body casing 43 is formed in a tubular shape, and surrounds the axes O, Nf, Nl, and M each extending parallel to each other as shown in FIG. 2. Moreover, the body casing 43 is housed inside an inner space region of the road wheel W. Referring to FIG. 1, the inner space region is defined by an inner periphery surface of a rim portion Wr, and a spoke portion Ws that couples to one end of the rim part Wr in the axis O direction. Furthermore, the wheel hub bearing unit 11, the reducer unit 31, and one region of the motor unit 21 in the axial direction are housed within the inner space region of the road wheel W. Moreover, the other region in the axial direction of the motor unit 21 protrudes out to the other side from the road wheel W in the axial direction. As such, the road wheel W houses most parts of the in-wheel motor drive device 10.

Referring to FIG. 2, the body casing 43 protrudes downwards at a position away from the axis O of the output gear 40 in the front-to-rear direction of the vehicle, more specifically at directly below the axis M of the input gear 33. This protruding portion forms an oil tank 47. On the other hand, a space S is secured between a part 43c directly below of the axis O among the body casing 43 and a lower part of the rim portion Wr. In the space S, a suspension member not shown that extends in the vehicle width direction will be disposed, and an outer end of the suspension member in the vehicle width direction and the part 43c directly below will be coupled free in orientation via a ball joint (not shown) for example.

The body casing 43 is tubular shaped, and, as shown in FIG. 1, houses the input shaft 32, the input gear 33, the intermediate gear 34, the intermediate gear 35, the intermediate gear 36, the intermediate gear 37, the intermediate shaft 38, the intermediate gear 39, the output gear 40, and the output shaft 41, and covers the other end of the wheel hub bearing unit 11 in the axis O direction. The body casing 43 encapsulates lubricating oil inside.

The body casing 43 includes, as shown in FIG. 1, a substantially flat front portion 43f that covers one side of the tubular portion of the speed reducer unit 31 in the axial direction, and a substantially flat back portion 43b that covers the other side of the tubular portion of the speed reducer unit 31 in the axial direction. The back portion 43b couples to the motor casing 25. Moreover, the back portion 43b couples to a suspension member not shown, for example a strut. This makes the in-wheel motor drive device 10 be supported by the suspension member.

The front portion 43f is formed with an opening 43p for the outer ring 12 to pass therethrough. The opening 43p has a sealing material 43s that seals the ring-shaped gap with the outer ring 12. Therefore, the outer ring 12 that serves as a rotatable body is housed in the body casing 43 except for the one end in the axis O direction.

The input gear 33 with a small diameter and the intermediate gear 34 with the large diameter are disposed on one side of the reducer 31 in the axial direction, and mesh with each other. The intermediate gear 36 with the small diameter and the intermediate gear 37 with the large diameter are disposed on the other side of the reducer 31 in the axial direction, and mesh with each other. The intermediate gear 39 with the small diameter and the output gear 40 with the large diameter are disposed on the one side of the reducer 31 in the axial direction, and mesh with each other. As such, the input gear 33, the plurality of intermediate gears 34, 36, 37, 39, and the output gear 40 mesh with each other, and configure a drive transmission path leading to the output gear 40 from the input gear 33 through the plurality of intermediate gears 34, 36, 37, 39. Due to the above meshing of the small diameter gears with the large diameter gears, the rotation of the input shaft 32 is reduced in speed at the intermediate shaft 35, the rotation of the intermediate shaft 35 is reduced in speed at the intermediate shaft 38, and the rotation of the intermediate shaft 38 is reduced in speed at the output shaft 41. Thus, the speed reducer unit 31 can secure a sufficient reduction ratio. Note that in FIG. 2 on, the individual teeth of the gears are not shown, and the gears are shown as addendum circles.

As shown in FIG. 2, the output shaft 41, the intermediate shaft 38, and the input shaft 32 are disposed in this order, with intervals therebetween in the front-to-rear direction of the vehicle. Furthermore, the intermediate shaft 35 and the intermediate shaft 38 are disposed above the input shaft 32 and the output shaft 41. According to such a first embodiment, an intermediate shaft may be disposed upper of the outer ring 12 that serves as a wheel hub, to secure a space for disposing the oil tank 47 below the outer ring 12 or to secure a space S directly below the outer ring 12. Therefore, the steering axis extending in the vertical direction can be provided intersecting with the space S, and can allow for suitably steering the road wheel W and the in-wheel motor drive device 10 about the steering axis.

Moreover, according to the present embodiment, as shown in FIG. 2, the axis M of the motor unit 21 is arranged offset from the axis O of the wheel hub bearing unit in the front-to-rear direction of the vehicle, the axis Nf of the intermediate shaft 35 is arranged offset above the axis O of the wheel hub bearing unit, and the axis Nl of the intermediate shaft 38 is arranged offset above the axis O of the wheel hub bearing unit. This makes it possible to secure the space S between the part 43c directly below of the axis O in the in-wheel motor drive device 10 and the lower part of the rim portion Wr. Furthermore, the steering axis of the wheel can be arranged intersecting with the road wheel W, thus improving steering properties of the wheels.

Moreover, according to the present embodiment, as shown in FIG. 1, the input shaft 32 and the output shaft 41 extend in the vehicle width direction, and as shown in FIG. 2, the input gear 33 and the output gear 40 are in a posture standing in the vertical direction and a lower edge 40b of the output gear 40 is disposed below a lower edge 33b of the input gear 33. As a result, the input gear 33 that rotates in high speed will not be immersed in the lubricating oil stored in a lower part of the reducer unit 31 inside the body casing 43, and thus allows for avoiding stirring resistance of the input gear 33.

Moreover, according to the present embodiment, as shown in FIG. 2, the plurality of intermediate axes 35, 38 includes a first intermediate shaft 35 disposed above and adjacent to the input shaft 32, which first intermediate shaft 35 is supplied with drive torque from the input shaft 32, and a final intermediate shaft 38 disposed above and adjacent to the output shaft 41, which final intermediate shaft 38 supplies the drive torque to the output shaft 41, and the input shaft 32, the first intermediate shaft 35, the final intermediate shaft 38 and the output shaft 41, when viewed from the axial direction of the plurality of intermediate axes 35, 38, are disposed in such a manner that a reference line that successively connects a center of the input shaft (axis M), a center of the first intermediate shaft 35 (axis Nf), a center of final intermediate shaft 38 (axis Nl), and a center of the output shaft 41 (axis O) draws an inverted U-shape. This reduces the size of the overall positioning of the plurality of axes and gears that configure the drive transmission path, and allows for housing the plurality of axes and gears inside the road wheel W.

Moreover, according to the present embodiment, as shown in FIG. 1, the outer ring 12 that serves as the wheel hub is a tubular body, and the wheel hub bearing unit 11 further includes a stationary shaft 15 that is disposed in the center hole of the outer ring 12 and that rotatably supports the outer ring 12. Accordingly, the output gear 40 can be coupled coaxially to an outer diameter side of the outer ring 12. Furthermore, drive force can be transmitted from the intermediate shaft 38 disposed to be offset about the outer ring 12, to the outer ring 12.

The body casing 43 further houses, as shown in FIG. 1, a pump shaft 51, rolling-element bearings 52*a*, 52*b*, a pump gear 53, and an oil pump 54. The axis P of the pump shaft 51 extends parallel to the axis O of the output shaft 41. Moreover, the pump shaft 51 is disposed away from the output shaft 41 in the forward-to-rear direction of the vehicle, is rotatably supported at both ends in the axis P direction via the rolling-element bearings 52*a*, 52*b*, and couples coaxially to the pump gear 53 at a center part in the axis P direction. The pump gear 53 meshes with the output gear 40.

The oil pump 54 is disposed further on the other side in the axis P direction than the rolling bearing 52*b*, and is provided on the other end of the pump shaft 51 in the axis P direction. By the oil pump 54 being driven by the output gear 40, the oil pump 54 draws in the lubricating oil from the oil tank 47 and discharges the drawn lubricating oil to the motor unit 21 and the speed reducer unit 31. This lubricates the motor unit 21 and the speed reducer unit 31.

With reference to FIG. 2, the pump shaft 51 of the present embodiment is positioned below the input shaft 32, and the oil tank 47 is positioned below the pump shaft 51. The oil pump 54 is positioned substantially coaxial to the pump shaft 51, and the lubricating oil stored in the oil tank 47 is drawn directly above the oil tank 47. Moreover, the pump shaft 51 and the oil tank 47 are disposed in the vehicle anterior to the output shaft 41. When the road wheel W is driven by the in-wheel motor drive device 10 and the vehicle runs, the oil tank 47 receives traveling wind from the front side of the vehicle and is cooled by air.

Figure 4:
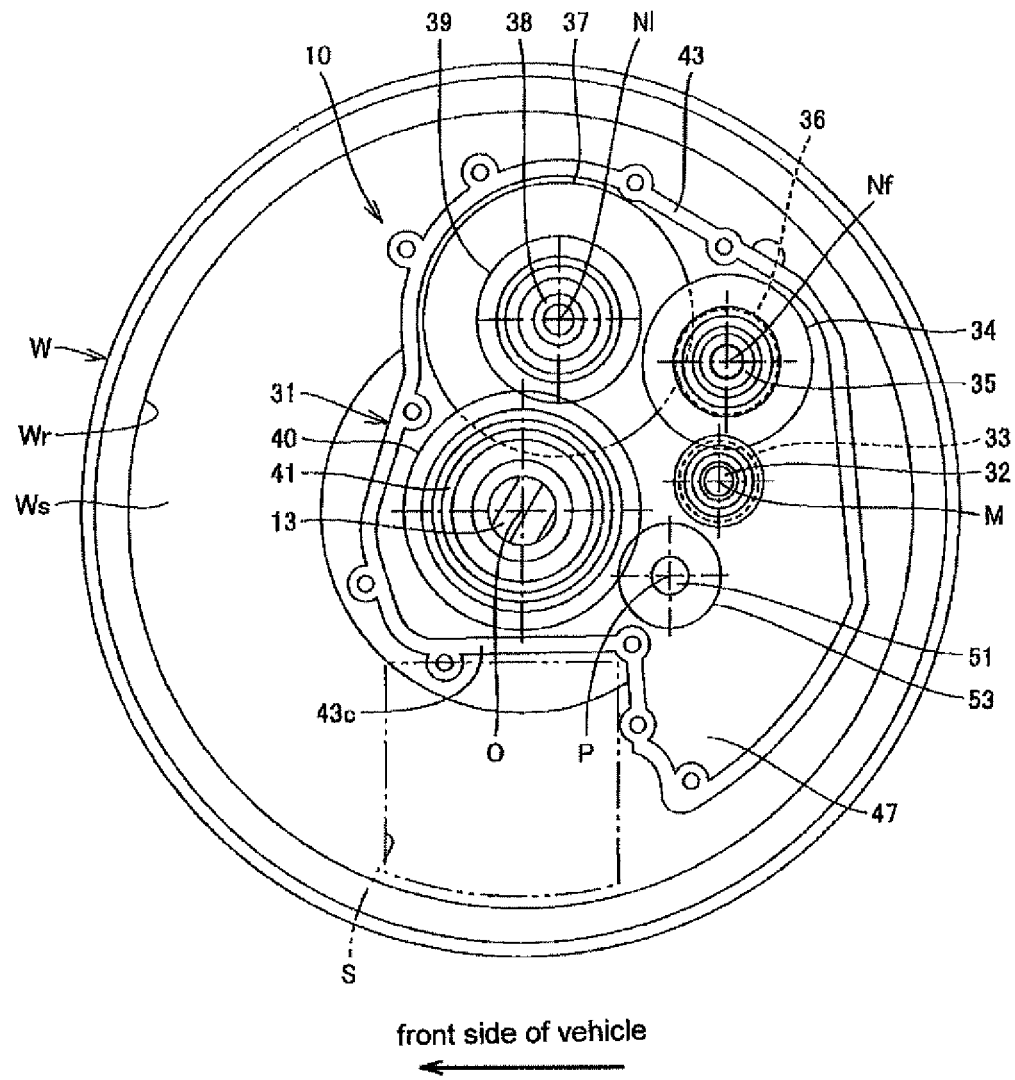
FIG. 4 is a back view showing the inside of a modification of the first embodiment.

As shown in FIG. 3, in the present embodiment, the input shaft 32 is disposed in the vehicle anterior to the output shaft 41, however as a modification, as shown in FIG. 4, the input shaft 32 may be disposed in the vehicle posterior to the output shaft 41. The first embodiment shown in FIG. 3 and the modification shown in FIG. 4 are configured of common components, and the positions of the components are symmetrical front and rear wise.

Figure 5:
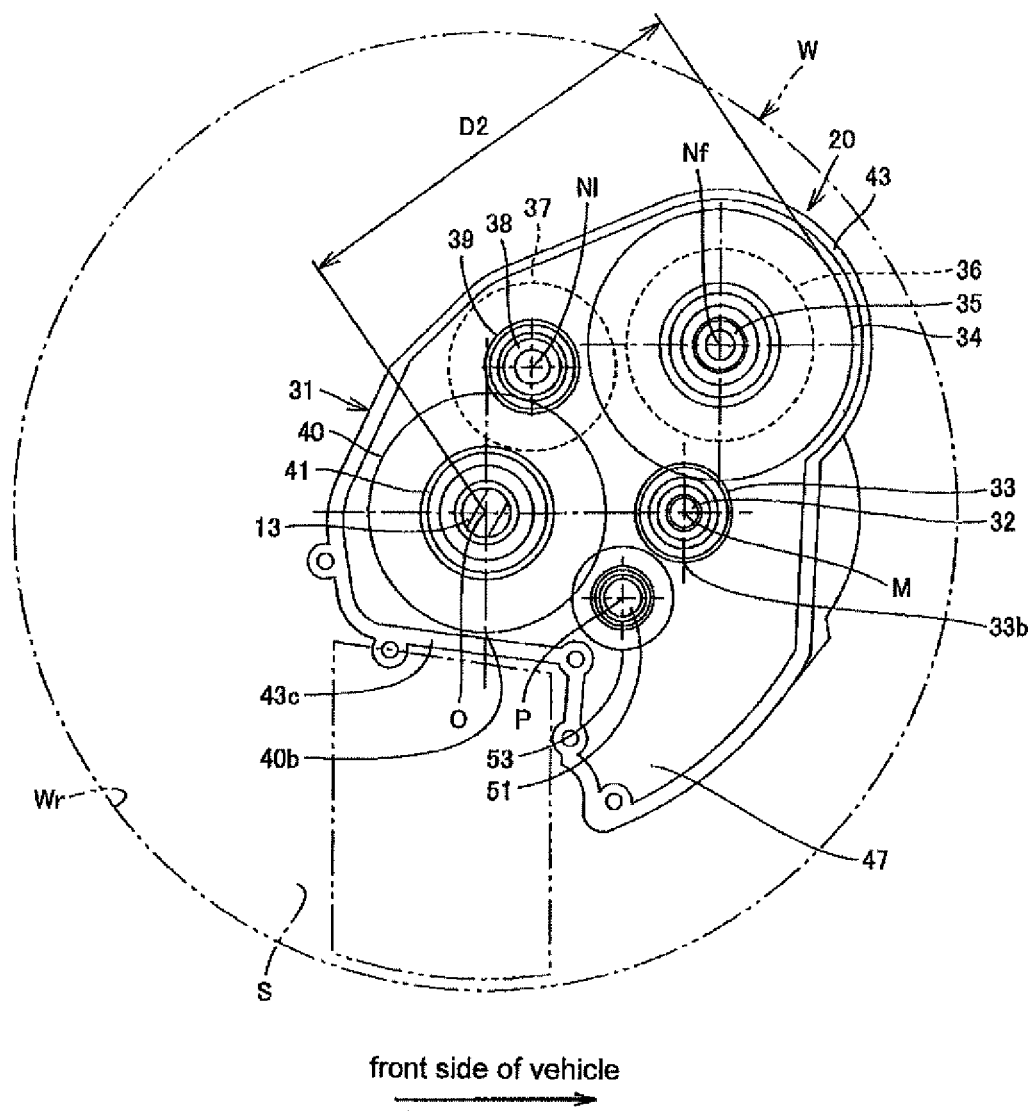
FIG. 5 is a front view showing an in-wheel motor drive device that serves as a second embodiment of the present invention.

Next describes a second embodiment of the present invention. FIG. 5 is a longitudinal section view showing an in-wheel motor drive device 20 that serves as a second embodiment of the present invention. As for the second embodiment, configurations common to the aforementioned embodiment will be assigned with identical reference signs and their descriptions will be omitted, and those with different configurations will be described below. In the first embodiment the intermediate gear 37 in the rear side of the vehicle is larger in diameter than the intermediate gear 34 in the front side of the vehicle as shown in FIG. 2, however in the second embodiment the intermediate gear 34 in the front side of the vehicle has a larger diameter than the intermediate gear 37 in the rear side of the vehicle, as shown in FIG. 5. Moreover, the intermediate gear 34 is a gear having the largest diameter among those in the speed reducer unit 31. In the second embodiment also, the space S can be secured lower of the in-wheel motor drive device 20.

An additional note here is that an advantage of the first embodiment in comparison to the second embodiment is the reduction in size of the speed reducer unit 31. In the speed reducer unit 31 of the first embodiment, as shown in FIG. 2, a distance from the axis O serving as the axle to a part protruding the most among the intermediate gears is represented as D1. Meanwhile, in the speed reducer unit 31 in the second embodiment, as shown in FIG. 5, the distance from the axis O serving as the axle to the part protruding the most among the intermediate gears is represented as D2. In a case in which the reduction ratio of the first embodiment and the reduction ratio of the second embodiment are the same, the distances become D1<D2, and the speed reducer unit 31 of the first embodiment is reduced in size.

Figure 6:
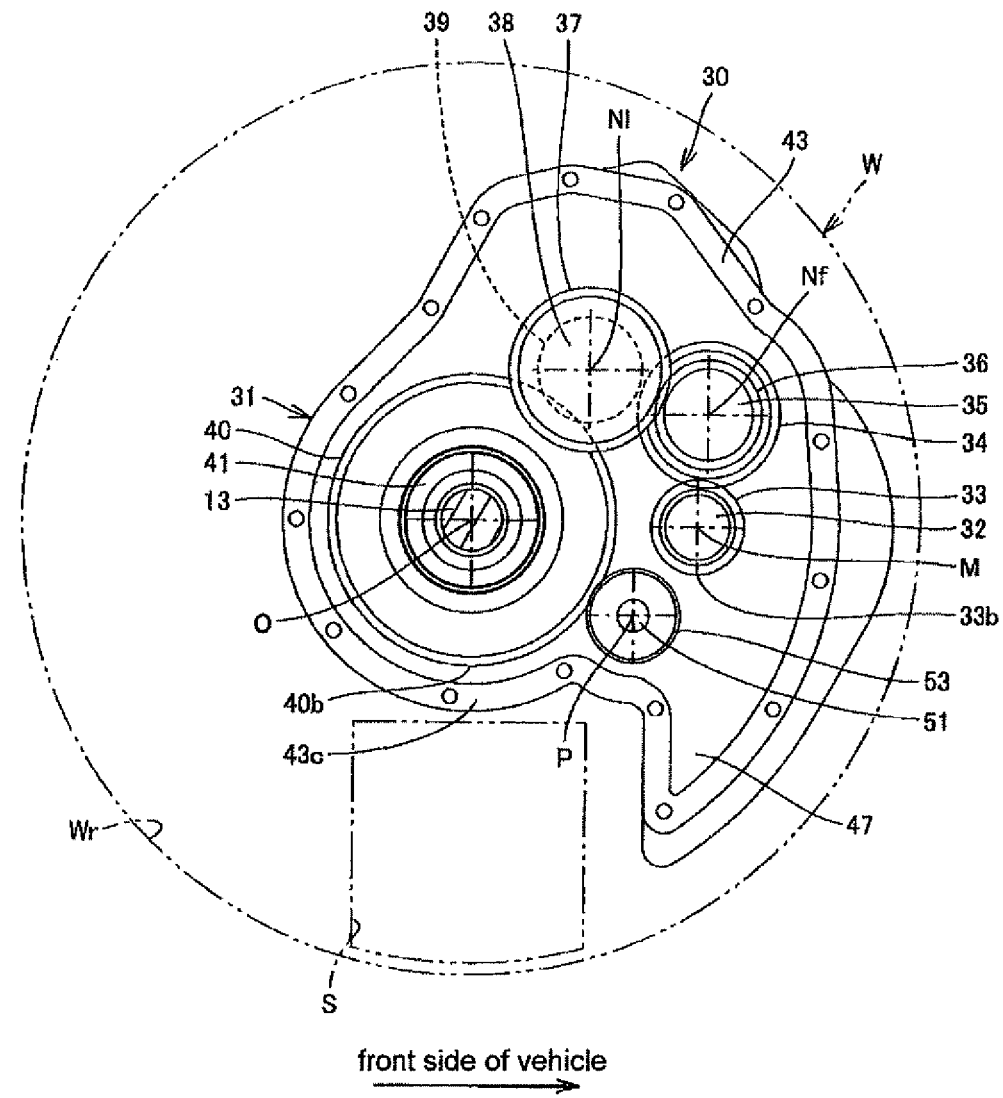
FIG. 6 is a front view showing an in-wheel motor drive device that serves as a third embodiment of the present invention.

Next describes a third embodiment of the present invention. FIG. 6 is a front view showing an in-wheel motor drive device 30 serving as a third embodiment of the present invention, and is a view that removes a front portion of the body casing to show the internal structure of the reducer unit. As for the third embodiment, configurations common to the aforementioned embodiment will be assigned with identical reference signs and their descriptions will be omitted, and those with different configurations will be described below. In the first embodiment the upper intermediate gear 37 is larger in diameter than the lower output gear 40 as shown in FIG. 2, however in the third embodiment the lower output gear 40 is larger in diameter than the upper intermediate gear 37, as shown in FIG. 6. Moreover, the output gear 40 is the gear having the largest diameter among those in the speed reducer unit 31. In the third embodiment also, the space S can be secured below the in-wheel motor drive device 30.

An additional note here is that an advantage of the first embodiment in comparison to the third embodiment is that a large space S can be secured. Upon comparing a radius dimension of the output gear 40 in the first embodiment shown in FIG. 2 with the radius dimension of the output gear 40 in the third embodiment shown in FIG. 6, when the reduction ratio of the first embodiment is the same as the reduction ratio of the second embodiment, the former becomes small, and the part 43*c* directly below the body casing 43 of the first embodiment is made to be at a position higher than that of the first embodiment. Therefore, in the first embodiment, the space S can be secured largely.

The above describes the embodiments of this invention with reference to the drawings, however this invention is not limited to those illustrated embodiments. Various corrections and modifications may be made to the illustrated embodiments within the same scope or within an equivalent scope, of this invention.

INDUSTRIAL APPLICABILITY

The in-wheel motor drive device serving as this invention is advantageously used in electric automobiles and hybrid vehicles.

REFERENCE SIGNS LIST

10 In-wheel motor drive device,
11 Wheel hub bearing unit,
12 Outer ring (Wheel hub),
13 Inner fixing member,
14 Rolling element,
15 Stationary shaft,
15*r* Root part,
16 Inner race,
21 Motor,
22 Motor rotating shaft,
23 Rotor,
24 Stator.
25 Motor casing,
31 Speed reducer unit, 32 Input shaft,
33 Input gear,
34,36,37,39 Intermediate gear,
35,38 Intermediate shaft,
40 Output gear,
41 Output shaft,
43 Body casing,
43p Opening,
43s Sealing member,
47 Oil tank,
51 Pump shaft,
53 Pump gear,
45 Oil pump,
M,Nf,Nl,O,P Axis,
S Space.

The invention claimed is:

1. An in-wheel motor drive device, comprising:
a wheel hub bearing unit adapted to rotatably support a wheel hub extending in a vehicle width direction; a motor unit adapted to drive the wheel hub; and a speed reducer unit adapted to reduce an output rotation of the motor unit and transmit this to the wheel hub bearing unit,
wherein the speed reducer unit includes: an input shaft adapted to couple to a motor rotating shaft of the motor unit; an output shaft adapted to couple to the wheel hub and extend parallel to the input shaft; at least one intermediate shaft extending parallel to the input shaft and the output shaft; an input gear adapted to couple to the input shaft; an output gear adapted to couple to the output shaft; and a plurality of intermediate gears adapted to couple to the intermediate shaft, the input gear, the plurality of intermediate gears, and the output gears meshing with each to configure a drive transmission path leading to the output gear from the input gear through the plurality of intermediate gears, and
wherein an axis of the input shaft, an axis of at least one intermediate shaft among the intermediate shafts, and an axis of the output shaft are disposed in this order in a front-to-rear direction of a vehicle, and an axis of at least one intermediate shaft among the intermediate shafts is disposed above the axis of the input shaft and the axis of the output shaft, and
further wherein the output shaft is configured with a center hole, the center hole sized to receive a portion of the wheel hub and having a center hole surface, the center hole surface of the output shaft directly connected to the wheel hub, the direction connection between the center hole surface and wheel hub allowing the output shaft to drive the wheel hub.

2. The in-wheel motor drive device according to claim 1, wherein the input shaft and the output shaft extend in a vehicle width direction,
the input gear and the output gear are made to be in a posture standing in a vertical direction, and
the output gear is disposed to have its lower end be below a lower end of the input gear.

3. The in-wheel motor drive device according to claim 1 or 2, wherein the at least one intermediate shaft includes a first intermediate shaft disposed above and adjacent to the input shaft and being supplied with driving torque from the input shaft, and a final intermediate shaft disposed above and adjacent to the output shaft and supplying driving torque to the output axis, and
the axis of the input shaft, an axis of the first intermediate shaft, an axis of the final intermediate shaft, and the axis of the output shaft, as viewed from an axial direction, are arranged to have a reference line successively connecting the axis of the input shaft, the axis of the first intermediate shaft, the axis of the final intermediate shaft, and the axis of the output shaft, draw an inverted U-shape.

4. The in-wheel motor drive device according to claim 1, wherein the wheel hub is a tubular body, and
the wheel hub bearing unit further comprises a stationary shaft that is disposed in a center hole of the wheel hub and that is adapted to rotatably support the wheel hub.

* * * * *